(12) United States Patent
Li et al.

(10) Patent No.: US 12,529,446 B2
(45) Date of Patent: Jan. 20, 2026

(54) EXTENDIBLE SUPPORT LEG

(71) Applicant: Guangdong Sirui Optical Co., Ltd., Zhongshan (CN)

(72) Inventors: Jie Li, Zhongshan (CN); Fan Xiao, Zhongshan (CN)

(73) Assignee: Guangdong Sirui Optical Co., Ltd., Zhongshan (CN)

( * ) Notice: Subject to any disclaimer, the term of this patent is extended or adjusted under 35 U.S.C. 154(b) by 0 days.

(21) Appl. No.: 18/597,809

(22) Filed: Mar. 6, 2024

(65) Prior Publication Data

US 2025/0305624 A1 Oct. 2, 2025

(30) Foreign Application Priority Data

Jan. 30, 2024 (CN) .......................... 202410133654.5
Jan. 30, 2024 (CN) .......................... 202420233746.6

(51) Int. Cl.
*F16M 11/32* (2006.01)
*F16M 11/26* (2006.01)

(52) U.S. Cl.
CPC ....... *F16M 11/26* (2013.01); *F16M 2200/027* (2013.01)

(58) Field of Classification Search
CPC ....... A47B 9/20; A47B 9/14; A47B 2009/145; A47B 21/02; A47B 2200/0052; A47B 41/02; A47C 3/40
See application file for complete search history.

(56) References Cited

U.S. PATENT DOCUMENTS

| | | | |
|---|---|---|---|
| 11,221,544 B1 * | 1/2022 | York | F16M 11/24 |
| 2011/0101716 A1 * | 5/2011 | Nolte | F16B 7/105 |
| | | | 294/174 |
| 2024/0191833 A1 * | 6/2024 | Gans | F16M 11/24 |

* cited by examiner

*Primary Examiner* — Amy J. Sterling
(74) *Attorney, Agent, or Firm* — Loeb & Loeb LLP

(57) ABSTRACT

An extendable support leg includes an axially telescopic top leg tube, a middle leg tube and an end leg tube. A first clamping mechanism is between the top leg tube and the middle leg tube. A second clamping mechanism is between the middle leg tube and the end leg tube. A locking control mechanism includes a locking ring connected to an upper end of the top leg tube, and a drive shaft connected to the locking ring has one end extended into the top leg tube. When the locking ring rotates, it drives the drive shaft to rotate axially. The drive shaft is connected to the first clamping mechanism to releasably prevent the middle leg tube from moving relative to the top leg tube, and the drive shaft is connected to the second clamping mechanism to releasably prevent the end leg tube from moving relative to the middle leg tube.

19 Claims, 7 Drawing Sheets

EXTENDIBLE SUPPORT LEG

TECHNICAL FIELD

The present invention generally relates to a technical field of photographic equipment. In particular, aspects of the invention are directed to an extendable support leg.

BACKGROUND

The camera support legs typically are part of a tripod and a monopod, and the support legs of the tripod and monopod usually have three leg tubes of different diameters, which can slide relative to each other, thus changing the length of the support legs, telescopically. When the support leg is at a desired length, any two adjacent leg tubes are locked. As such, a typical support leg telescopic structure needs to gradually lock or loosen the locking mechanism between the adjacent two leg tubes, and the operation is more cumbersome.

In the prior art, although there is a support leg that utilizes a single lever to realize synchronous locking or unlocking of a multi-section leg tube or section, the structure of realizing locking by using a lever alone. The locking effect of the support leg as a whole is undesirable, and it is easy to loosen when the support leg is subjected to a larger weight or load on at the top of the tripod or monopod.

SUMMARY

Therefore, embodiments of the invention attempt to provide technical solutions to technical problems associated with a single lever to control multi-section leg tubes of a support leg in a synchronous manner in the prior art, when the user experience is poor and the lever is easy to be touched and unlocked by accident.

In solving or alleviating the above-mentioned technical problem, the technical solutions of aspects of the present invention are as follow:

An extendable support leg may include a top leg tube, a middle leg tube, and an end leg tube that are sequentially arranged from the outside to the inside. Each leg tube may be axially arranged so that they telescopically move among each other. In some embodiments, the extendable support leg may further include a first clamping mechanism arranged between the top leg tube and the middle leg tube, and a second clamping mechanism arranged between the middle leg tube and the end leg tube.

In some embodiments, a locking control mechanism may be connected to an upper end of described top leg tube, and a locking ring arranged with a circumferential rotation of the top leg tube. In some embodiments, the locking control mechanism may further include a drive shaft that is in transmission connection with the locking ring and extends into the top leg tube at one end. In some embodiments, when the locking ring rotates in a circumferential direction relative to the top leg tube, the locking ring drives the drive shaft to rotate axially around itself. In some other embodiments, the drive shaft is operationally connected to the first clamping mechanism to prevent a movement of the middle leg tube relative to the top leg tube in a releasing manner, and the drive shaft is operationally connected to the second clamping mechanism to prevent the movement of the end leg tube relative to the middle leg tube in a releasing manner.

In some further embodiments, the upper end of the top leg tube may be fixedly or securely connected with a lower base, and the drive shaft rotates in a circumferential direction relative to each other and may be fixedly connected to the lower base in a relative axial direction.

In other embodiments, the locking ring may rotate in a relative circumferential direction and may be fixedly connected to the lower base in a relative axial direction.

In some embodiments, the periphery of an upper end of the lower base is provided with a step structure, and the inner wall of the locking ring is convex with an inner convex structure matched with the step structure.

In yet another embodiments, the locking ring and the drive shaft may be connected through gears.

Further, in some embodiments, the locking ring may be in transmission connection with the drive shaft through a gear transmission assembly.

Further, in some embodiments, the top of the lower base may be securely or fixedly connected with an upper cover. In some embodiments, the gear transmission assembly may be a planetary gear assembly, and the planetary gear assembly may comprise a stellar gear rotatably arranged on the central hole of the lower base, a plurality of planetary gears that are positioned between the upper cover and the lower base. In some embodiments, the gear transmission may be connected in the peripheral of the star gear, and a ring gear that is located at the periphery of a plurality of planetary gears and meshed with a plurality of planetary gears. In some embodiments, the drive shaft may be securely or fixedly connected to the gear shaft of the stellar gear and may be coaxially arranged with the gear shaft of the stellar gear, and the locking ring may be fixedly sleeved at the periphery of the ring gear.

Further, in some embodiments, the gear ring may be fixedly connected to the above-mentioned convex structure.

Further, in some embodiments, the outer wall sleeve of the locking ring may be provided with an anti-slip sleeve, and the periphery of the anti-slip sleeve may be provided with an anti-slip structure.

Further, in some embodiments, the first clamping mechanism may comprise a drive tube, an upper locking piece, a locking main body and an expansion member. In some aspects, the drive tube may be connected to the outer periphery of the drive shaft and may be fixed in a relative circumferential direction and sliding in a relative axial direction with the drive shaft. In some embodiments, the locking body may be fixedly connected with the middle leg tube and may be threaded to the outer periphery of the drive tube. In some embodiments, the upper locking piece may be securely or fixedly connected to the periphery of the upper end of the drive tube, and the expansion member may be fixed axially with the locking main body and may be located at the periphery of the upper locking member. In some embodiments, under the effect of the upper locking member, the expansion member may be in a bracing state that expands outward to support the inner wall of the top leg tube and a loose state that may retract inward to separate from the inner wall of the front segment leg tube.

Further, in some embodiments, the cross-section of the drive shaft and the drive tube may be identical, and the cross-sections may be non-circular.

Further, in some embodiments, the locking member comprises a conical segment with an outer conical inclined plane, the expansion member may comprise at least two mutually independent expansion blocks, the inner wall of the expansion block may include an inner conical inclined plane, and the outer conical inclined plane may be matched with the inner conical inclined plane.

In yet some embodiments, an elastic kit may be arranged around the periphery of at least two of the expansion blocks, and the elastic kit may exert a force in the direction of inward retraction for at least two of the expansion blocks.

Further, in some embodiments, the outer wall of the expansion member may be provided with an internal friction plate for countering against the inner wall of the top leg tube.

Further, in some embodiments, the second clamping mechanism may include an inner tube that may be fixedly or securely connected to the drive tube and may be disposed inside the middle leg tube relative to the axial direction. In some embodiments, a locking sleeve connected to the inner tube that may be far away from one end of the drive tube and may be located or disposed on the inner side of the middle leg tube, an elastic sleeve that may be sleeved around the outer periphery of the end leg tube and partially may extend into the locking sleeve and may be fixed axially with the middle leg tube in relation to the middle section. In some embodiments, when the locking sleeve and the elastic sleeve move in a relative axial direction, the elastic sleeve may be in a clamping state that may retract inward to clamp the outer wall of the end leg tube under the effect of the locking sleeve. In some embodiments, during the loosening state, the locking sleeve may be detached, resulting in loosening the end leg tube.

Further, in some embodiments, the inner wall of the locking sleeve may be provided with an internal oblique guide surface, the outer wall of the elastic sleeve may be provided with an external oblique guide surface, and the internal oblique guide surface may be matched with the external oblique guide surface.

Further, in some embodiments, the outer wall of the lower end of the middle leg pipe may be fixedly connected with a connecting sleeve, the peripheral threaded connection of the connecting sleeve may be connected with an adjusting sleeve. In some embodiments, the elastic sleeve may be securely or fixedly connected to the adjusting sleeve relative to the axial direction.

Further, in some embodiments, a notch may be formed in the side wall of the elastic sleeve, and the notch may extend from the middle of the side wall of the elastic sleeve to the end of the side wall.

Further, in some other embodiments, a first anti-slip structure for preventing the middle leg tube from sliding out of the top leg tube may be arranged between the top leg tube and the middle leg tube, and a second anti-slip structure for preventing the end leg tube from sliding out of the inner tube is arranged between the inner tube and the end leg tube.

As such, the technical solution of the present invention at least may include the following advantages:

1. In some embodiments, the extendable support leg disclosed by the present invention may arrange the locking control mechanism comprising locking ring and drive shaft at the upper end of the front section leg tube. In some embodiments, one end of the drive shaft may stretch into the top leg tube and may be in transmission connection with the first clamping mechanism and the second clamping mechanism. In some embodiments, when the length of the support legmay be adjusted to a required length, the locking ring may be rotated in an opposite direction and the locking ring may drive the transmission axially in a rotation in an opposite direction. In some embodiments, the reverse rotation of the drive shaft may be transmitted to the first clamping mechanism and the second clamping mechanism. In some embodiments, the first clamping mechanism may prevent the movement of the middle leg tube relative to the top leg tube, and may enable the second clamping mechanism preventing the movement of the rear section leg tube relative to the middle section leg tube. In yet some other embodiments, the adjustment of the length of the support leg maybe realized. When compared to the traditional mode of configuring the lever to adjust the length of the support leg, utilizing the locking ring to drive the drive shaft to rotate not only provides a good user experience with the locking effect between the three sections of the leg tubes of the supporting leg, and eliminates the protruding buckle set on the outside of the leg tubes, and avoids being operated by mistake. As such, embodiments of the invention may also be convenient for the storage of the support leg.

BRIEF DESCRIPTION OF THE DRAWINGS

In order to more clearly illustrate the specific embodiments of the present application or the technical solution in the prior art, the following will be a brief introduction to the drawings required in the specific embodiment or prior art description, obviously, the drawings described below are some embodiments of the present application, for those skilled in the art, without the premise of creative labor, may also obtain other drawings according to these drawings. Embodiments are now described, by way of example only, with reference to the accompanying drawings, in which.

Figure 1:
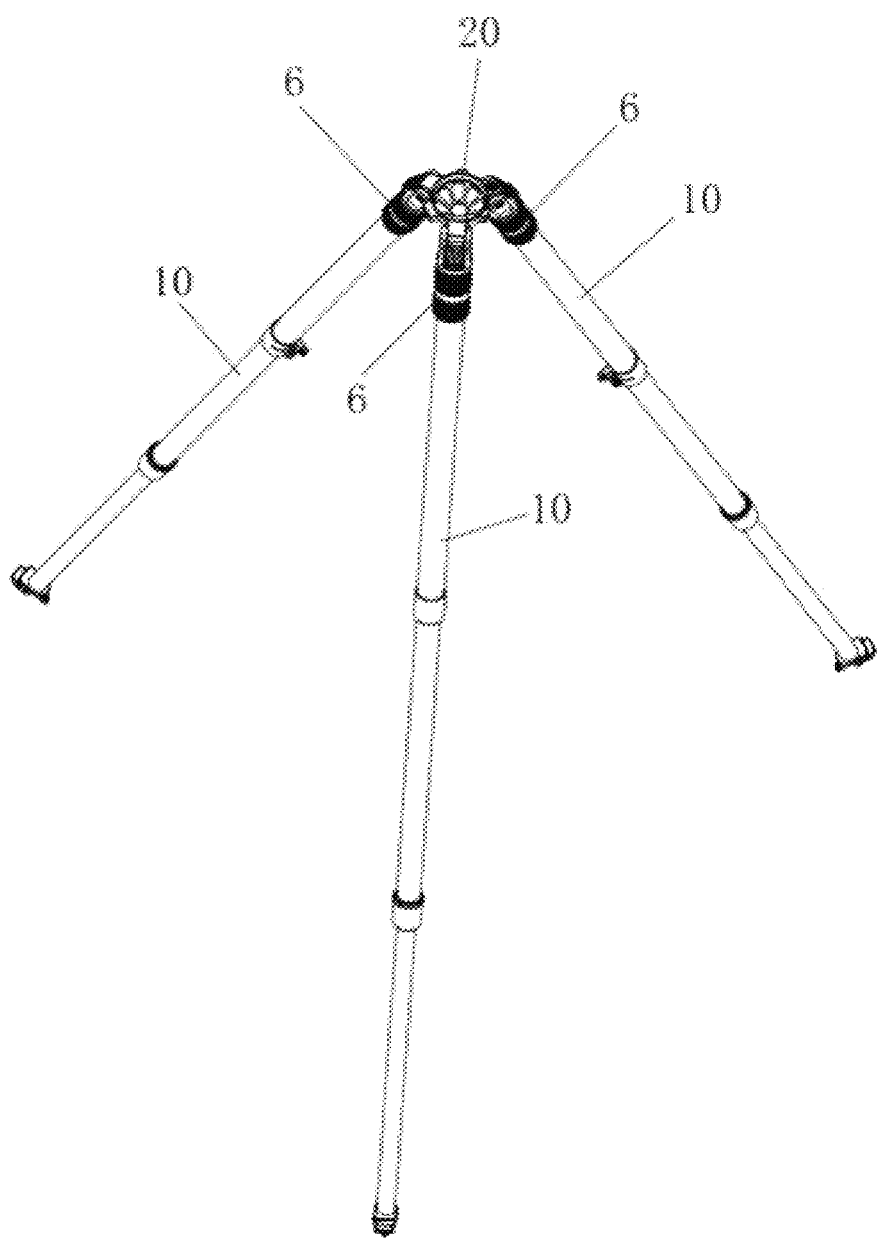
FIG. 1 is a schematic structural diagram of a tripod in an embodiment of the present invention.

Descriptions of the reference numbers: 10. Supporting leg; 20. Head element; 1. Top leg tube; 2. Middle leg tube; 3. End leg tube; 4. First clamping mechanism; 41. Drive tube; 42. Upper locking piece; 43. Locking body; 44. Expansion member; 45. Elastic kit; 46. Internal friction plate; 5. Second clamping mechanism; 51. Inner tube; 52. Locking sleeve; 53. Elastic set; 531. Notch; 54. Connecting sleeve; 55. Adjusting sleeve; 56. Connecting piece; 57. Limiting plate; 6. Locking control mechanism; 61. Locking ring; 611. Inner structure; 62. Drive shaft; 631. Sun gear; 632. Planetary gear assembly; 64. Lower base; 65. Upper cover; 66. Anti-slip sleeve; 7. First anti-slip structure; 8. Second anti-slip structure; 9. Head end assembly.

DETAILED DESCRIPTION

The technical solution of the aspects of the invention will be clearly and completely described below in conjunction with the accompanying drawings. Obviously, the described embodiments are some embodiments of the present application, not all embodiments. Based on the embodiments in the present application, all other embodiments obtained by those of ordinary skill in the art without performing creative labor fall within the scope of protection of the present application.

In the description of the present application, it should be noted that the orientation or position relationship indicated by the terms "center", "up", "top", "down", "end," "left", "right", "vertical", "horizontal", "inside", "outside" and so on is based on the orientation or position relationship shown in the drawings, only to facilitate the description of the present application and simplify the description, not to indicate or imply that the device or element referred to must have a specific orientation, constructed and operated in a specific orientation, so it cannot be understood as a limitation of the present application. In addition, the terms "first", "second", "third" are for descriptive purposes only and cannot be understood as indicating or implying relative importance.

In the description of the present application, it should be noted that, unless otherwise expressly provided and qualified, the terms "installation", "connection", "connection" should be understood in a broad sense, for example, may be secured connection, may be detachable connection, or integrated connection; may be mechanical connection, or electrical connection; may be directly connected, or indirectly connected through an intermediate medium, may be internal connection of two elements. For those of ordinary skill in the art, the specific meaning of the above terms in the present application may be understood in a case-by-case situation.

Further, the technical features involved in different embodiments of the present application described below may be combined with each other as long as they do not constitute a conflict with each other.

Some embodiments of the invention may disclose an extendable support leg, which may be a three-legged tripod or the support leg of a monopod. Using a camera tripod as an example, FIG. 1 shows a schematic structural diagram of a tripod 100 in an embodiment of the present invention. In one aspect, the tripod 100 includes a head element 20 of the tripod 100 located on the top of the tripod 100 and three supporting legs 10. Each support leg10 is pivotally connected to the head element 20. These three support legs 10 are the extendable support legs discussed by this application.

Figure 2:
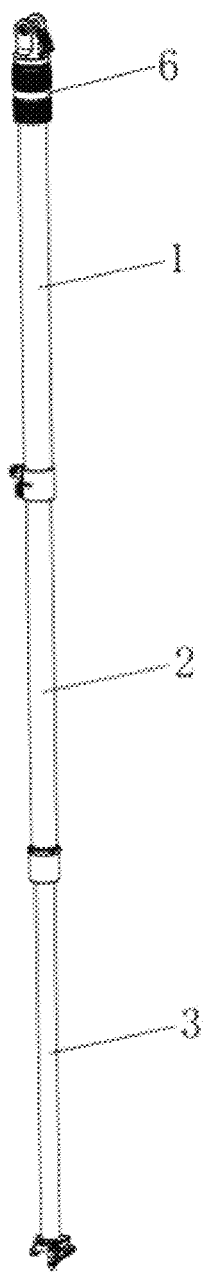
FIG. 2 is a schematic structural diagram of a single support legin an embodiment of the present invention.

FIG. 2 shows a three-dimensional structural view of the support leg 10. The support leg 10 includes a top leg tube 1, a middle leg tube 2 and an end leg tube 3 that are arranged sequentially from outside to inside and are axially telescopic. A locking control mechanism 6 is connected to the top. In one embodiment, the support leg 10 may include a first clamping mechanism 4 in its interior (not shown in FIG. 2) arranged between the top leg tube 1 and the middle leg tube 2. The support leg 10 may further include a second clamping mechanism 5 arranged between the middle leg tube 2 and the end leg tube 3 (not shown in FIG. 2).

Figure 3:
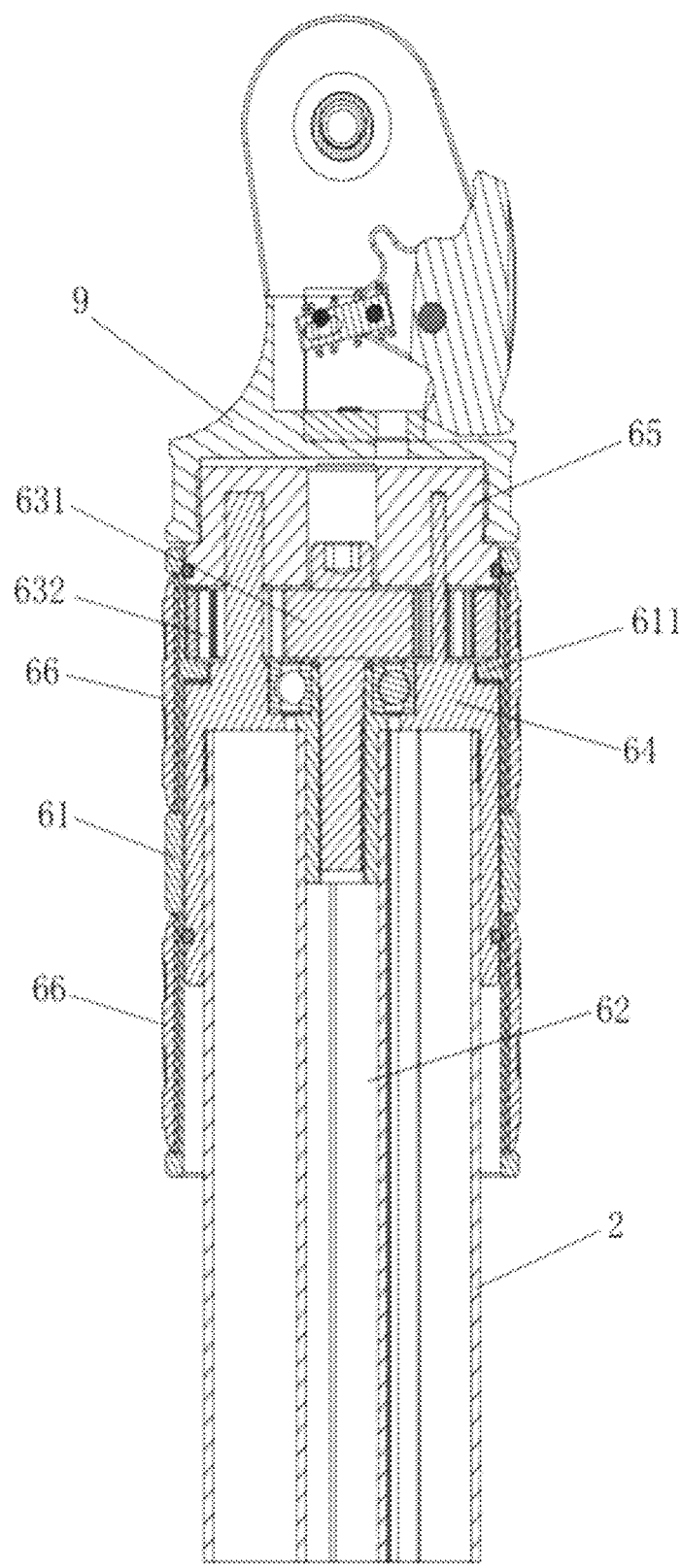
FIG. 3 is a schematic structural diagram of a locking control mechanism in one embodiment of the present invention.

FIG. 3 shows a schematic diagram of the internal structure of the locking control mechanism 6. The locking control mechanism 6 includes a locking ring 61, a drive shaft 62, a gear transmission assembly, a lower base 64 and an upper cover 65.

In some embodiments, the lower base 64 may be securely connected to the upper end of the top leg tube 1. In one embodiment, the lower half of the lower base 64 may be sleeved on the outer periphery of the upper end of the top leg tube 1, and the upper half of the lower base 64 blocks the upper end of the top leg tube 1. In some embodiments, a center of the upper half of the lower base 64 includes a hole in the center. In some embodiments, the locking ring 61 and the draft shaft 62 are both relatively circumferentially rotatable and relatively axially connected to the lower base 64. In some embodiments, the outer periphery of the upper half of the lower base 64 may include a step structure, and an inner wall of the locking ring 61 may include an inner structure 611 that matches the step structure. In one embodiment, the upper cover 65 may be secured to the top of the lower base 64 through a plurality of bolts.

In some embodiments, the gear assembly may be disposed between the lower base 64 and the upper cover 65 and may include a planetary gear assembly. In some embodiments, the support leg 10 may connect to the head end assembly 9 of the head element 20 as being placed on top of the upper cover 65 while connecting to the upper cover 65. In some embodiments, the planetary gear assembly 632 may include a sun gear 631 in the center. In some aspects, three planetary gears 632 may be connected to the outer circumference of the sun gear 631, and a ring gear located on the outer circumference of the three planetary gears 632 and meshed with the three planetary gears 632 (not shown in the figure). In one aspect, a gear shaft of the sun gear 631 may pass through the center hole of the lower base 64 and is rotationally connected to the lower base 64 through bearings. In some embodiments, gear shafts of the three planet gears 632 may be connected between the lower base 64 and the upper cover 65. In yet another embodiment, the ring gear may be disposed between the base 64 and the upper cover 65. In some embodiments, a gasket may be disposed between the upper end of the ring gear and the lower end surface of the upper cover 65 to reduce friction when the two rotate relative to each other. In an alternative embodiment, the locking ring 61 may be directly engaged to and transmission connected with teeth on the outer circumference of the drive shaft 62 through the teeth on the inner wall. Or the inner wall of the locking ring 61 may be securely connected with a ring gear, and the ring gear may engage to the teeth of the outer circumference of the drive shaft 62 to drive movement.

In this embodiment, the drive shaft 62 may be fixedly connected to the gear shaft of the sun gear 631 and is arranged coaxially with the gear shaft of the sun gear 631. One end of the drive shaft 62 may extend into the top leg tube 1. In one embodiment, the locking ring 61 may be securely sleeved on the outer periphery of the ring gear. In one aspect, the inner diameter of the locking ring 61 may be larger than the outer diameter of the top leg tube 1. In one aspect, the lower half of the upper cover 65, the outside of the ring gear and the outside of the lower base 64 may all locked. In one aspect, the locking ring 61 may be covered inside. In one aspect, when the locking ring 61 rotates circumferentially relative to the top leg tube 1, the locking ring 61 may drive the drive shaft 62 to rotate axially around itself through the planetary gear assembly 632. In one aspect, the drive shaft 62 may be operatively connected to the first clamping mechanism 4 to enable the middle leg tube 2 while releasably prevented from moving relative to the top leg tube 1. In one aspect, the drive shaft 62 may be operably connected to the second clamping mechanism 5 to releasably prevent the end leg tube 3 from moving relative to the middle leg tube 2.

In some embodiments, the lower end of the ring gear may be fixed on an inner structure 611 to ensure that the locking ring 61 may drive the ring gear to rotate. In one aspect, a gasket may be disposed between the lower end of the inner structure 611 and the lower base 64 to reduce friction when the two rotate relative to each other.

In some embodiments, grooves may be provided above and below the outer wall of the locking ring 61, and an anti-slip sleeve 66 is set inside the two grooves. The outer periphery of the anti-slip sleeve 66 may be provided with an anti-slip structure, and the anti-slip structure may include anti-slip threads. By equipping the anti-slip sleeve 66, it may enhance the operation of rotating the locking ring 61 by hand. In one aspect, washers may be provided at contact positions between the inner wall of the upper end of the locking ring 61 and the outer wall of the upper cover 65. The contact positions between the inner wall of the lower end of the locking ring 61 and the outer wall of the lower base 64 may be provided to reduce friction during relative rotation.

In some embodiments, in order to reduce the overall weight of the support leg 10, the drive shaft 62 may be a hollow tubular structure.

Figure 4:
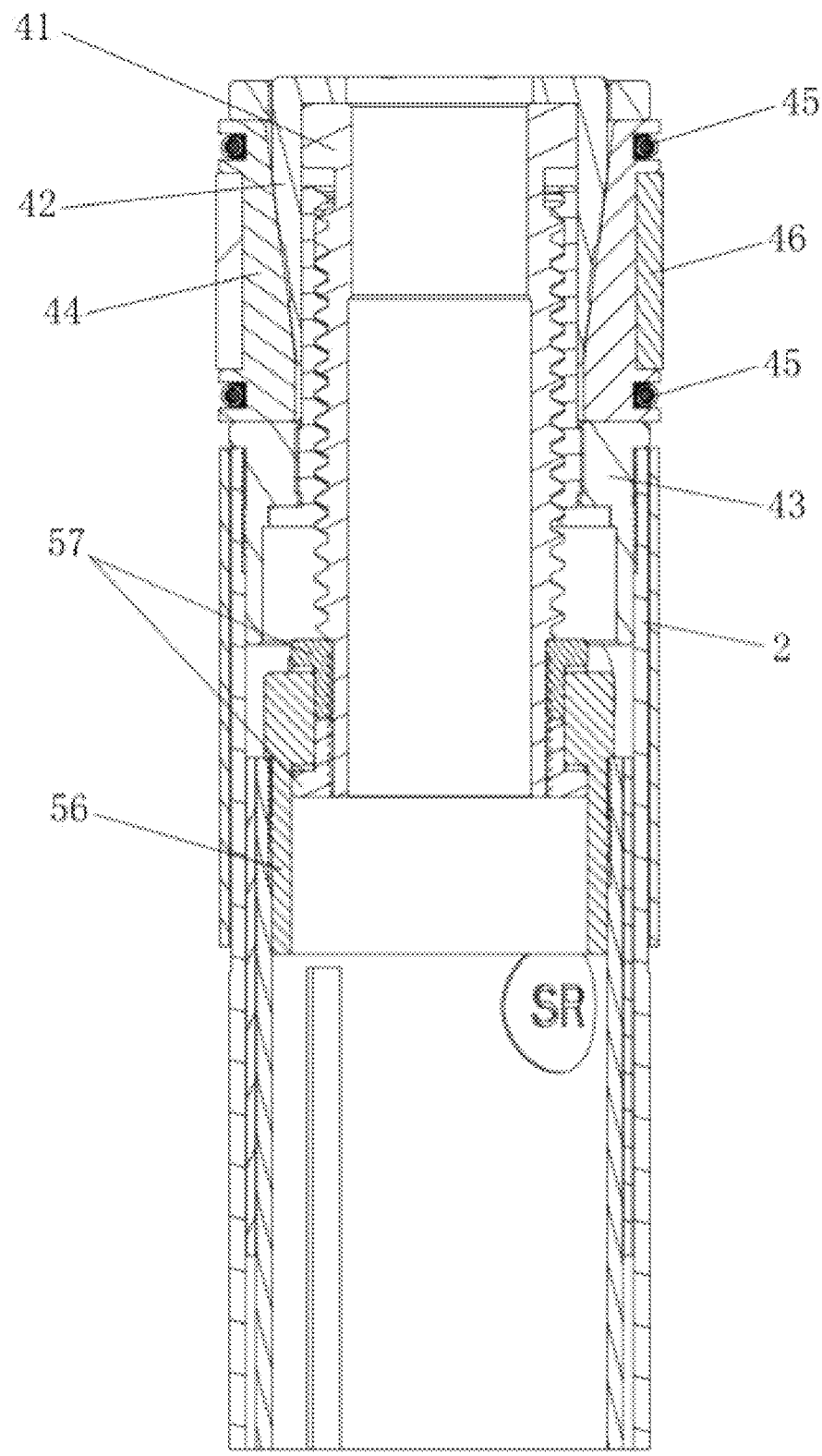
FIG. 4 is a schematic structural diagram of a first clamping mechanism in one embodiment of the present invention.

FIG. 4 illustrates a schematic structural view of the first clamping mechanism according to one embodiment. In one embodiment, the first clamping mechanism includes a drive tube 41, an upper locking piece 42, a locking body 43 and an expansion piece 44. In one aspect, cross-sections of the drive shaft 62 and the drive tube 41 may be all non-circular. In one embodiment, the cross-sections of the drive shaft 62 and the drive tube 41 are both square. In one embodiment, the inner diameter cross-section size of the drive tube 41 may be the same size as the outer diameter cross-section size of the drive shaft 62. In one aspect, the drive tube 41 may be sleeved on the outer circumference of the drive shaft 62. In some embodiments, the drive tube 41 and the drive shaft 62 may maintain relative circumferential fixation and relative axial sliding. In some embodiments, the outer periphery of the middle part of the drive tube 41 may be provided with an external thread structure. The locking body 43 may be securely connected to the middle leg tube 2 and may include threads to connect to the outer periphery of the drive tube 41. In some embodiments, the locking body 43 may include a locking fixing sleeve securely connected to the end of the middle leg tube 2, and may be securely on the locking fixing sleeve. In one aspect, the locking sleeve may include an internal thread structure, and the external thread structure of the drive pipe 41 may include threads matched with the internal thread structure of the locking sleeve. In one aspect, the upper locking member 42 may be securely connected to the outer periphery of the upper end of the drive tube 41, and the lower end of the upper locking member 42 may extend toward the outside of the locking sleeve of the locking body 43. In one aspect, the expansion member 44 may be axially secured relative to the locking body 43 and is located on the outer periphery of the upper locking piece 42. In one embodiment, the upper locking piece 42 may include a tapered section with an outer tapered bevel. In another aspect, the expansion member 44 may include a plurality of independent expansion blocks. In some embodiments, the inner wall of the plurality of expansion blocks may include an inner conical bevel and an outer conical bevel that matches with the inner conical bevel. In one aspect, when the locking ring 61 drives the drive shaft 62 to rotate forward, the drive shaft 62 may drive the drive tube 41 to rotate. Due to the thread cooperation between the drive tube 41 and the locking body 43, the drive tube 41 may move downward and may be securely connected to the drive tube 41 so that the upper locking piece 42 also moves downward. In some embodiments, when the upper locking piece 42 moves downward, the upper locking piece 42 may squeeze the expansion member 44 through an inclined plane, and the expansion member 44 may expand outward under the action of the upper locking piece 42 to tighten the inner wall of the top leg tube 1, thereby realizing the locking of the top leg tube 1 and the middle leg tube 2. On the other hand, when the locking ring 61 drives the drive shaft 62 to rotate in the reverse direction, the drive tube 41 moves upward, and the upper locking member 42 may be securely connected to the drive tube 41, which also moves upward. When the upper locking member 42 moves upward, it is loosened and expanded. The expansion member 44 is drawn inward, and the top leg tube 1 and the middle leg tube 2 are separated, thereby realizing the unlocking of the top leg tube 1 and the middle leg tube 2.

In some embodiments, the upper and lower ends of the outer periphery of the multiple expansion blocks may include with annular grooves, and the elastic kit 45 may set in both annular grooves. In some embodiments, the elastic kit 45 may be used to tighten the multiple expansion block inward. In some embodiments, the elastic set 45 may prevent the expansion block from loosening through directional force of the elasticity while providing some elastic movement space for the expansion block.

In some embodiments, the outer wall of the expansion block may include an internal friction plate 46 for abutting against the inner wall of the top leg tube 1. In some embodiments, the arrangement of the inner friction plate 46 may reduce the rotational wear between the expansion block and the top leg tube 1. In some embodiments, when the internal friction plate 46 may be excessively worn, the internal friction plate 46 may be replaced to maintain the original state.

Figure 5:
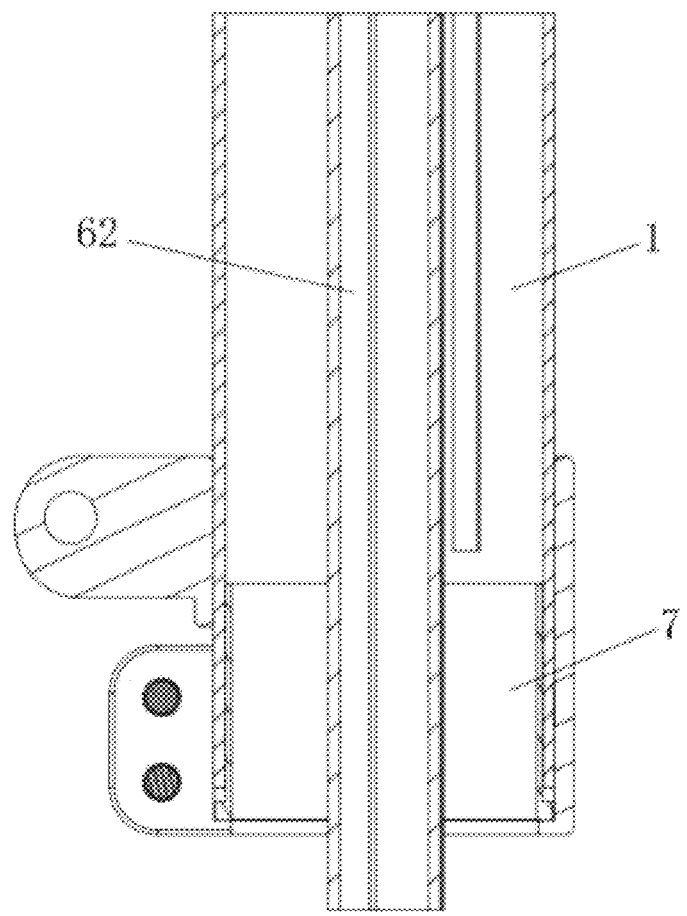
FIG. 5 is a schematic structural diagram of a first anti-slip structure in one embodiment of the present invention.

FIG. 5 may illustrate a schematic structural diagram of a first anti-slip structure 7 according to one embodiment. In one aspect, a first anti-slip structure 7 may be disposed between the top leg tube 1 and the middle leg tube 2 to prevent the middle leg tube 2 from sliding out of the top leg tube 1. In one aspect, the anti-slip structure 7 may be located at the inner wall of the lower end of the top leg tube 1.

Figure 6:
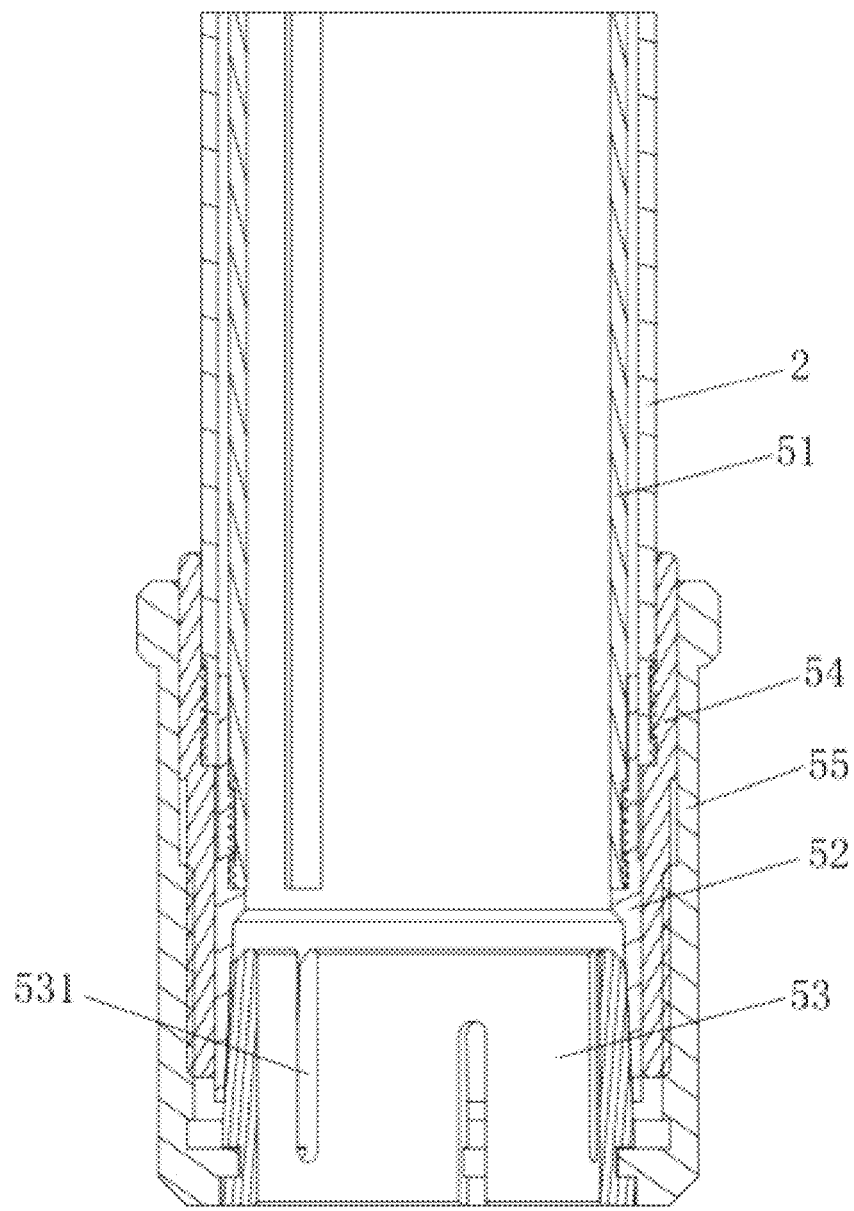
FIG. 6 is a schematic structural diagram of a second clamping mechanism in one embodiment of the present invention.

FIG. 6 illustrates a schematic structural diagram of the second clamping mechanism 5 according to one embodiment. In some embodiments, the second clamping mechanism 5 may include an inner tube 51, a locking sleeve 52, and an elastic set 53. In one embodiment, the inner tube 51 may be located inside the middle leg tube 2. In another embodiment, referring to FIG. 4, a pair of limiting plates 57 may be securely connected to the lower end of the drive tube 41. Further, in some embodiments, limiting grooves may be disposed at the outer circumferences of the pair of limiting plates 57. In another aspects, the upper end of the inner tube 51 may be securely connected to a connecting piece 56, and the upper end of the connecting piece 56 may include limiting grooves so that the connecting piece 56 and the drive tube 41 may remain relatively axially secured while still rotating relatively circumferentially. In one embodiment, the drive tube 41 may drive the inner tube 51 to move up and down through a pair of limiting plates 57 and the connecting piece 56, and at the same time, the inner tube 51 may rotate circumferentially relative to the drive tube 41. Referring to FIG. 6, the locking sleeve 52 may be securely connected to the lower end of the inner tube 51 away from the drive tube 41. In one aspect, the elastic sleeve 53 may be disposed at the outer periphery of the end leg tube 3 and may partially extend into the locking sleeve 52. In one aspect, the elastic set 53 may be connected to the middle leg tube 2 are relatively axially secured. In some embodiments, the inner wall of the locking sleeve 52 may include an inner inclined guide surface, and the outer wall of the elastic set 53 may include an outer inclined guide surface. In another aspect, the inner inclined guide surface may match the outer inclined guide surface. In some embodiments, when the outer inclined guide surface of the outer wall of the elastic set 53 is squeezed by the inner inclined guide surface of the locking sleeve 52, the elastic set 53 may move inward under the extension of the locking sleeve 52 to clamp the outer wall of the end leg tube 3. In some embodiments, the middle leg tube 2 and the end leg tube 3 may be locked. In another embodiment, when the force from the locking sleeve 52 on the elastic set 53 disappears or dissipates, the elastic set 53 may return to its original state or position due to its own elasticity. When a user releases and compresses the outer wall of the end leg tube 3, the middle leg tube 2 and the end leg tube 3 may be unlocked.

In some embodiments, the side wall of the elastic sleeve 53 may include a plurality of notches 531, and the notches 531 may extend from the middle of the side wall of the elastic set 53 to the end of the side wall. In some embodiments, the arrangement of the notches 531 on the elastic set 53 may improve the elastic deformation performance of the elastic set 53.

In some embodiments, the outer wall of the lower end of the middle leg tube 2 may be securely connected with a connecting sleeve 54, and the outer periphery of the connecting sleeve 54 may include threads to connect with an adjusting sleeve 55. In one aspect, the outer wall of the elastic set 53 may include an annular groove. In some embodiments, the lower end of the inner wall of the adjusting sleeve 55 may include a clamping block extending into the annular clamping groove, and the clamping block may cooperate with the side wall of the annular clamping groove to achieve relative axial fixation and relative circumferential rotation with the adjusting sleeve 55 and the elastic set 53. By rotating the adjusting sleeve 55, the axial position of the elastic set 53 relative to the middle leg tube 2 may be adjusted to better ensure that the elastic set 53 and the locking sleeve 52 may be locked.

Figure 7:
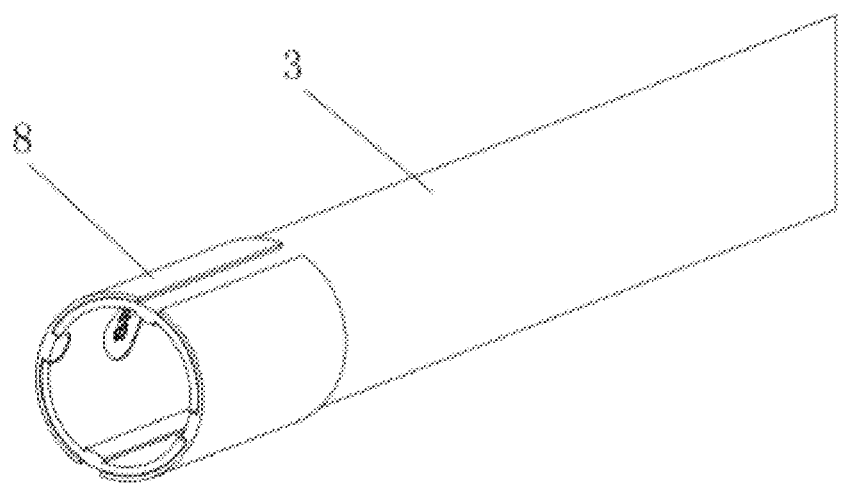
FIG. 7 is a schematic structural diagram of a second anti-slip structure in one embodiment of the present invention.

FIG. 7 illustrates a schematic structural diagram of the second anti-slip structure 8 according to one embodiment. In one aspect, the second anti-slip structure 8 may be disposed between the inner tube 51 and the end leg tube 3 to prevent the end leg tube 3 from sliding out of the inner tube 51. In one aspect, the second anti-slip structure 8 may be an anti-slip piece secured on the outer wall of the upper end of the end leg tube 3.

In summary, the extendable support leg 10 disclosed by embodiments of the present invention may include a locking control mechanism 6 having a locking ring 61, a planetary gear assembly 632 and a drive shaft 62 at the upper end of the top leg tube 1. In one aspect, one end of the drive shaft 62 may extend into the top leg tube 1 and may be connected to the first clamping mechanism 4 and the second clamping mechanism 5. In one aspect, when adjusting the length of the support leg 10, a user may rotate the locking ring 61 in one direction, and the locking ring 61 may pass through the planetary gear assembly 632 to drive the drive shaft 62 to perform forward rotation around its own axis. In one aspect, the forward rotational force of the drive shaft 62 may be transmitted to the first clamping mechanism 4 and the second clamping mechanism 5, causing the first clamping mechanism 4 to release the middle leg tube 2 relative to the movement of the top leg tube 1. In one aspect, the second clamping mechanism 5 may be released through the movement of the end leg tube 3 relative to the middle leg tube 2. In yet some other embodiments, when the length of the support leg 10 is adjusted to the required length, the user may turn to lock in the opposite direction. In yet another embodiment, the locking ring 61 may drive the drive shaft 62 to rotate in the opposite direction through the planetary gear assembly 632. In some embodiments, the reverse rotation force of the drive shaft 62 may be transmitted to the first clamping mechanism 4 and the second clamping mechanism 5, so that the first clamping mechanism 4 may prevent the middle leg tube 2 from moving relative to the top leg tube 1 while enabling the second clamping mechanism 5 to prevent the end leg tube 3 from moving relative to the middle leg tube 2. In one aspect, the above actions thereby result in the adjustment of the length of the support leg 10. Embodiments of the invention, when compared to the traditional method of adjusting the length of the support leg 10 using a push button, aspects of the invention may use the locking ring 61 and the planetary gear assembly 632 to drive the drive shaft 62 to rotate, which not only provide a better locking effect between the three leg tubes of the support leg 10, but also save avoiding the use a protruding handle on the outside of the leg tubes, which may cause accidental contact thereof, while enabling the convenient storage of the support leg 10.

Obviously, the above embodiments are only examples for clarity, and do not qualify the embodiment. For ordinary people skilled in the art, other different forms of change or change can be made on the basis of the above description. There is no need and cannot be exhaustive of all implementations. The apparent change or variation derived therefrom remains within the scope of protection created by the present application.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

The invention claimed is:

1. An extendable support leg comprising:
a top leg tube (1), a middle leg tube (2) and an end leg tube (3) arranged axially telescopically and sequentially from outside to inside, wherein the support leg (10) comprises a first clamping mechanism (4) disposed between the top leg tube (1) and the middle leg tube (2), and wherein the support leg (1) comprises a second clamping mechanism (5) disposed between the middle leg tube (2) and the end leg tube (3);
a locking control mechanism (6), comprising a locking ring (61) connected to the upper end of the top leg tube (1) and arranged to rotate circumferentially relative to the top leg tube (1), wherein the locking ring (61) is connected to the upper end of the top leg tube (1), wherein the locking ring (61) drives to extend into a drive shaft (62) in the top leg tube (1);
wherein the locking ring (61) rotates circumferentially relative to the top leg tube (1) to move the middle leg tube (2) relative to the top leg tube (1) so that the drive shaft (62) is operably connected to the second clamping mechanism (5) to releasably prevent movements of the end leg tube (3) relative to the middle leg tube (2).

2. The extendable support leg of claim 1, wherein an upper end of the top leg tube (1) is securely connected to a lower base (64), and wherein the drive shaft (62) rotates relatively circumferentially and relatively axially connected to the lower base (64).

3. The extendable support leg of claim 2, wherein the locking ring (61) is relatively circumferentially rotatable and relatively axially connected to the lower base (64).

4. The extendable support leg of claim 2, further comprising a step structure disposed on an outer periphery of the upper end of the lower base (64), and wherein the locking ring (61) comprises an inner wall having an inward convex structure (611) matching to that of the step structure.

5. The extendable support leg of claim 4, wherein the locking ring (61) and the drive shaft (62) are drivingly connected with matching gears.

6. The extendable support leg of claim 5, wherein the locking ring (61) is drivingly connected to the drive shaft (62) through a gear transmission assembly.

7. The extendable support leg of claim 6, further comprising an upper cover (65) being securely connected above the lower base (64), wherein the gear transmission assembly comprises a planetary gear assembly (632), and the planetary gear assembly (632) includes a sun gear (631) rotated on a central hole of the lower base (64), disposed between the upper cover (65) and the lower base (64), wherein the planetary gear assembly (632) comprises a plurality of planetary gears on an outer circumference of the sun gear (631) and a ring gear disposed at the outer circumference of the plurality of planetary gears and engaged with the plurality of planetary gears for transmission, wherein the drive shaft (62) is securely connected to a gear shaft of the sun gear (631) and arranged coaxially with the gear shaft of the sun gear (631), and wherein the locking ring (61) is securely sleeved on peripheries thereof.

8. The extendable support leg of claim 7, wherein the ring gear is securely connected above an inner structure (611).

9. The extendable support leg of claim 1, wherein the locking ring (61) comprises an anti-slip sleeve (66) on an outer wall thereof, wherein the anti-slip sleeve (66) comprises an anti-slip structure.

10. The extendable support leg of claim 1, wherein the first clamping assembly includes a drive tube (41), an upper locking piece (42), a locking body (43) and the expansion member (44), wherein the drive tube (41) is connected to an outer circumference of the drive shaft (62) and maintains relative circumferential position and relative axial sliding with the drive shaft (62), wherein a main body of the locking body (43) is securely connected to the middle leg tube (2) and connected to an outer periphery of the drive tube (41) via threads, wherein the upper locking piece (42) is securely connected to the outer periphery of the drive tube (41), wherein the expansion member (44) is axially secured relative to the locking body (43) and is disposed on the outer periphery of the upper locking piece (42), wherein the expansion member (44) is in a tightened state in response to outwardly movement of the upper locking piece (42) expanding against the inner wall of the top leg tube (1), or is in a loosen state in response to inwardly movement of the upper locking piece (42) separating from the inner wall of the top leg tube (1).

11. The extendable support leg of claim 10, wherein cross-sections of the drive shaft (62) and the drive tube (41) are non-circular and are the same.

12. The extendable support leg of claim 10, wherein the upper locking piece (42) comprises a tapered section with an outer conical bevel, and wherein the expansion member (44) comprises at least two independent expansion blocks, wherein each of the at least two independent expansion blocks comprises an inner conical slope, and the outer conical bevel matches the inner conical slope.

13. The extendable support leg of claim 12, wherein the at least two of the independent expansion blocks comprises elastic sets (45) surrounding outer circumferences thereof, wherein the elastic sets (45) are configured to exert inwardly force on the at least two of the independent expansion blocks.

14. The extendable support leg of claim 12, wherein the outer wall of the expansion member (44) comprises an internal friction plate (46) for abutting against the inner wall of the top leg tube (1).

15. The extendable support leg of claim 10, wherein the second clamping mechanism (5) comprises a relatively axially secured component connected to the drive tube (41) and disposed at an inner tube (51) of the middle leg tube, wherein the second clamping mechanism (5) is connected at one end of the inner tube (51) away from the drive tube (41) and disposed inside the locking sleeve (52) of the middle leg tube (2), wherein the second clamping mechanism (5) is disposed at a periphery of the end leg tube (3) and having a portion thereof extending into the locking sleeve (52) and is axially secured relative to elastic set (53) of the middle leg tube (2), wherein when the locking sleeve (52) and the elastic set (53) move relative to each other in the axial direction, the elastic set (53) is configured to shrink inward under actions of the locking sleeve (52) to clamp the outer wall of the end leg tube (3) in a tighten state and is configured to separate from the locking sleeve (52) to release the end leg tube (3) in a loosen state.

16. The extendable support leg of claim 15, wherein the locking sleeve (52) comprises an inner wall with an inner inclined guide surface, and wherein the elastic set (53) comprises an outer wall with an outer inclined guide surface, wherein the inner inclined guide surface matches to the outer inclined guide surface.

17. The extendable support leg of claim 15, wherein the middle leg tube (2) comprises a connecting sleeve (54) at a lower end of an outer wall thereof, wherein the connecting sleeve (54) comprises an adjusting sleeve (55) disposed at a periphery of the connecting sleeve (54) via threads, wherein the elastic set (53) is relatively axially securely connected to the adjusting sleeve (55).

18. The extendable support leg of claim 15, wherein the elastic set (53) comprises a notch (531) on a side wall thereof, wherein the notch (531) is configured to extend from a middle part of the side wall to an end part of the side wall of the elastic set (53).

19. The extendable support leg of claim 15, further comprising a first anti-slip structure between the top leg tube (1) and the middle leg tube (2) to prevent the middle leg tube (2) from sliding out of the top leg tube (1), and further comprising a second anti-slip structure (8) disposed between the inner tube (51) and the end leg tube (3) to prevent the end leg tube (3) from sliding out of the inner tube (51).

\* \* \* \* \*